July 21, 1959

F. T. WALLIN 2,895,467

NECK SEAL

Filed March 17, 1953

INVENTOR.
Francis T. Wallin
BY

United States Patent Office 2,895,467
Patented July 21, 1959

2,895,467

NECK SEAL

Francis T. Wallin, Brookline, Mass.

Application March 17, 1953, Serial No. 342,857

9 Claims. (Cl. 128—30)

The present invention relates to a neck seal construction for a respirator and to other types of similar devices where a wall opening is to be closed about some element projecting through the same for effecting a seal of a chamber in which the device forms a part of the wall. The present invention finds great application to respirators and other such devices where it is desired to adjust the seal readily and quickly about the neck or other parts of the body.

The present invention is a continuation-in-part of my U.S. Patent No. 2,718,225, issued September 20, 1955, and also to my prior issued patent No. 2,478,852, August 9, 1949.

In my copending application, Serial No. 150,919, I have described a plastic tube which is gathered at the end and retained by elastic tapes or bands which hold the ends of the tubes on the adjustable rings which may be rotated one with respect to the other for tightening the neck seal of the respirator. These rings when tightened pleat the tube in what has been called a spiral lock and which gives the general appearance of a shutter for a camera when partially closed.

The present invention relates more particularly to the improvement of the plastic tube itself and the method and means of attaching the tubes to the concentric rings, one of which is attached to the head of the respirator in a permanent position and the second of which is adjustably rotated coaxially with respect to the first until the tube is properly tightened about the neck of the patient whereupon it is locked or fixed in its adjusted position.

One of the purposes of the present invention is to provide a tube which not only is readily applied to and removed from the flanges of the rings which are attached to the respirator, but also to provide a tube which will be durable, strong and not likely to break or split when applied to the respirator.

A further purpose of the present invention is to provide a tube construction in which the ends of the tubes are reinforced and in which a puncture or slight jar at the edge will not destroy or impair the utility of the tube.

A further advantage of the present invention is obtained by sealing in the ends of the tubes a free ring member which does not substantially contract the ends of the tube when in place.

A further advantage of the present invention is the means of sealing by heat sealing methods a substantially free O ring in each end of the tube which has just sufficient stretch to permit the ends of the tube to be firmly held to the flanges of the rings of the respirator.

A further advantage of the present invention is the covering of the edges of the flanges of the rings by means of a friction rubber-like cover which acts to protect the end surfaces of the tube which comes in contact with the edges of the flanges of the rings.

Additional and further advantages will be more readily apparent from the description in the specification set forth below when taken in connection with the drawings illustrating an embodiment of the same, in which.

Figure 1:
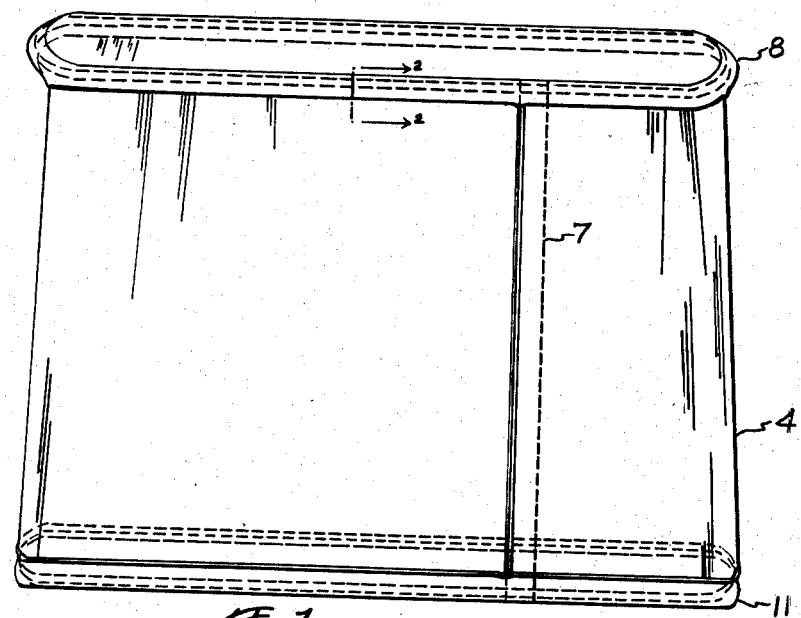
Figure 1 shows in perspective a view of the tube forming the neck seal of the respirator as applied to the flanges of the respirator rings.
Figure 3:
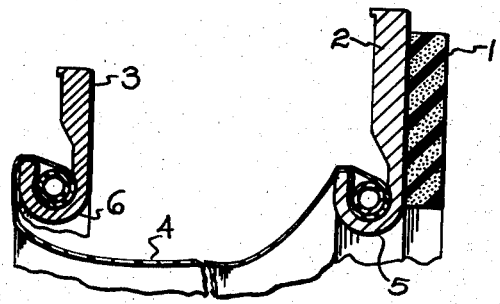
Figure 3 shows a fragmentary section showing the tube applied to the neck seal rings of the respirator, and, Figure 4 shows an enlarged detail of the left portion of Figure 3 indicating the covering element of the edge of the flange.

With reference to the drawings the actual respirator to which the neck seal is applied is not shown in the drawings, but in Figure 3 however, the gasket or seal element 1 goes up against the head plate of the respirator and next to this is the first neck seal ring 2 which is attached to the respirator by suitable means such as bolts or clamps or any other suitable device. The ring 2 affords with the gasket or sealing ring 1 a complete seal about the neck opening in the head plate of the ordinary respirator as is commonly understood by reference to my patent mentioned above. A second ring seal 3 which may be turned with respect to the ring 2 holds one end of the tube 4, the other end of which is held by the ring 2 as indicated in Figure 3. Both rings 2 and 3 are formed with turned flanges such as 5 and 6 which may be U shaped as indicated in Figure 3 or may be just slightly curved to enable it to receive and hold the ends of the tube 4 in a manner which will be described later. The tube 4 may be formed from a sheet of plastic material such as vinyl plastic or some other form of plastic sheet of the thermo-plastic type and may be heat sealed along the seam as indicated at 7, Figure 1.

Figure 2:
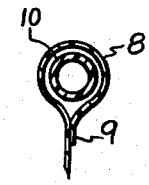
Figure 2 shows a section substantially on the line 2—2 of Figure 1.

The ends of the tube are folded over in a loop fashion as shown at 8, Figure 2, and sealed to the side of the tube all around its periphery as indicated at 9. Within the loop which extends all around the tube, there is positioned an O ring 10 which is free from the inner wall of the loop. The O ring 10 is preferably also of a plastic material as contrasted with a rubber elastic ring or band and has just sufficient stretch so that it may be forced over the end of the flange and contract sufficiently to hold the ends of the tube tightly in the groove of the flange of the rings. The plastic tube 4 is also flexible, yieldable, thin and stretchable to a degree of approximately not much more than 20% of its length. It is not essential that the plastic ring be very stretchable, but a stretch of 10% to 20% serves as usefulness in flexibility, softness in the adjustment of the opening about the neck of the patient.

The ends 8 and 11 of the tube need not be of the same size but should be of such a size to fit their respective flanges to which they are to be applied.

Figure 4:
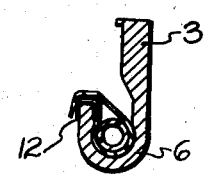

As is indicated in Figures 3 and 4, the flanges 5 and 6 have the surfaces of the tubes next to the O rings or ends lying against them. Covering the edge of the flange is a cover member 12 which may be of plastic or rubber material and which provides a certain amount of friction against pulling the ends of the tubes out of the grooves of the flanges.

The covering element 12 is not necessary particularly for this purpose, but it furnishes a smooth, soft covering for the edge of the metallic flange against which the ends of the tubes rest and therefore aids in preserving the tube against stresses which may be applied in adjusting or tightening the plastic tube about the neck of the patient. The tubes 4 are readily replaced simply by forcing the ends of the tubes over the respective flanges which can be done by hand without the use of any tools. The plastic tube 4 may be quite thin and flexible, of the thickness of an ordinary sheet of paper in the range of approximately .010" or a little greater.

Having now described my invention, I claim:

1. A plastic flexible yieldable tube having ends of different peripheral size, said ends being formed as closed loops and a plastic flexible yielding elastic ring, freely positioned in said loops and coextensive therewith about each end of said tube.

2. A plastic flexible yieldable tube having ends of different peripheral size, said ends being formed as closed loops and a plastic flexible yielding elastic hollow ring freely positioned in said loops and coextensive therewith about each end of said tube.

3. A plastic flexible yieldable tube having ends formed as closed loops and a plastic flexible yielding elastic ring, freely positioned in said loops and coextensive therewith about each end of said tube.

4. A plastic flexible yieldable tube having turned hems at each end of the tube secured to the wall of the tube about its periphery near the ends forming closed loops and an elastic O ring freely positioned in said loops.

5. Means for providing a neck seal for a respirator comprising two rings each having angular flange elements of a general U shape in section, a plastic, flexible, yieldable tube having turned hems at each end of the tube secured to the wall of the tube about its periphery near the ends forming closed loops and an O ring freely positioned in each of said loops, each of said loops with its O ring having sufficient stretch to be forced over a U shaped flange and held tightly in the base of the U.

6. Means for providing a neck seal for a respirator comprising two rings each having angular flange elements for holding the ends of a plastic tube, said plastic tube comprising a plastic, flexible, yieldable tube having turned hems at each end of the tube secured to the wall of the tube about its periphery near the ends forming closed loops and an O ring freely positioned in each of said loops, each of said loops with its O ring having sufficient stretch to be forced over said angular flange elements and held tightly thereto.

7. Means for providing a neck seal for a respirator comprising two rings each having angular flange elements for holding the ends of a plastic tube, said plastic tube comprising a plastic, flexible, yieldable tube having turned hems at each end of the tube secured to the wall of the tube about its periphery near the ends forming closed loops and an O ring freely positioned in each of said loops, each of said loops with its O ring having sufficient stretch to be forced over said angular flange elements and held tightly thereto, and a cover element covering the end edges of each of said angular flanges.

8. Means for providing a neck seal for a respirator comprising two rings each having angular flange elements for holding the ends of a plastic tube, said plastic tube comprising a plastic, flexible, yieldable tube having turned hems at each end of the tube secured to the wall of the tube about its periphery near the ends forming closed loops and an O ring freely positioned in each of said loops, each of said loops with its O ring having sufficient stretch to be forced over said angular flange elements and held tightly thereto, and a cover element of rubberlike material covering the end edges of each of said angular flanges.

9. A tube as set forth in claim 3 in which the loop is secured by a heat seal means.

References Cited in the file of this patent

UNITED STATES PATENTS

| | | |
|---|---|---|
| 1,431,918 | Arthur | Oct. 17, 1922 |
| 2,630,799 | Nickles | Mar. 10, 1953 |
| 2,695,608 | Gibbon | Nov. 30, 1954 |
| 2,761,442 | Emerson | Sept. 4, 1956 |